(12) United States Patent
Pachidis et al.

(10) Patent No.: US 11,472,560 B2
(45) Date of Patent: Oct. 18, 2022

(54) SYSTEM FOR AN AIRCRAFT

(71) Applicant: ROLLS-ROYCE plc, London (GB)

(72) Inventors: Vasileios Pachidis, Milton Keynes (GB); Salvatore Ippedico, Bedford (GB)

(73) Assignee: ROLLS-ROYCE PLC, London (GB)

(*) Notice: Subject to any disclaimer, the term of this patent is extended or adjusted under 35 U.S.C. 154(b) by 320 days.

(21) Appl. No.: 16/856,442

(22) Filed: Apr. 23, 2020

(65) Prior Publication Data

US 2020/0346762 A1 Nov. 5, 2020

(30) Foreign Application Priority Data

May 3, 2019 (GR) ............................... 20190100194

(51) Int. Cl.
| | | |
|---|---|---|
| *B64D 13/06* | (2006.01) | |
| *B64C 9/00* | (2006.01) | |
| *B64C 13/24* | (2006.01) | |
| *B64C 15/14* | (2006.01) | |
| *B64D 13/02* | (2006.01) | |
| *B64D 27/10* | (2006.01) | |

(52) U.S. Cl.
CPC ............... *B64D 13/06* (2013.01); *B64C 9/00* (2013.01); *B64C 13/24* (2013.01); *B64C 15/14* (2013.01); *B64D 13/02* (2013.01); *B64D 27/10* (2013.01); *B64D 2013/0611* (2013.01)

(58) Field of Classification Search
CPC ........ B64D 13/06; B64D 13/02; B64D 27/10; B64D 2013/0611; B64D 2013/0622; B64C 9/00; B64C 13/24; B64C 15/14
See application file for complete search history.

(56) References Cited

U.S. PATENT DOCUMENTS

| | | | |
|---|---|---|---|
| 9,511,849 B2* | 12/2016 | Shmilovich | B64C 21/04 |
| 2009/0108125 A1 | 4/2009 | Shmilovich et al. | |
| 2011/0031353 A1 | 2/2011 | Stolte et al. | |
| 2014/0061387 A1 | 3/2014 | Reckzeh et al. | |
| 2016/0075435 A1 | 3/2016 | Stieger et al. | |
| 2016/0167789 A1* | 6/2016 | Knight | B64D 31/14 |
| | | | 454/71 |
| 2017/0106985 A1* | 4/2017 | Stieger | B64D 13/02 |
| 2017/0191413 A1 | 7/2017 | Knight et al. | |

(Continued)

OTHER PUBLICATIONS

Sep. 28, 2020 Search Report issued in European Patent Application No. 20170775.9.

(Continued)

*Primary Examiner* — Rodney A Bonnette
(74) *Attorney, Agent, or Firm* — Oliff PLC

(57) ABSTRACT

A system for providing active flow control in an aircraft having a gas turbine engine. The system includes an environmental control system that includes a cabin blower system having a compressor operable to compress a fluid delivered by a fan section of the gas turbine engine to generate a pressurised fluid for use by the environmental control system. The environmental control system is fluidicly connected to an active flow control system via a fluid supply line, for allowing the pressurised fluid generated by the compressor to be supplied to the active flow control system so that it can be ejected from the aircraft across an exterior surface of a movable control element of the aircraft.

14 Claims, 6 Drawing Sheets

(56) References Cited

U.S. PATENT DOCUMENTS

2018/0043995 A1    2/2018   Shmilovich et al.
2018/0216538 A1*   8/2018   Papa .................. B64D 15/04
2019/0323427 A1   10/2019   Mackin

OTHER PUBLICATIONS

Nov. 25, 2019 Brush Combined Search and Examination Report issued in British Patent Application No. 1908370.0.

* cited by examiner

SYSTEM FOR AN AIRCRAFT

CROSS-REFERENCE TO RELATED APPLICATIONS

This specification is based upon and claims the benefit of priority from Greek Patent Application Number 20190100194 filed on 3 May 2019, the entire contents of which are incorporated herein by reference.

BACKGROUND

1. Field of the Disclosure

The present disclosure concerns a system for providing active flow control in an aircraft having a gas turbine engine, particularly a system including an environmental control system and an active flow control system.

2. Description of the Related Art

Civil transport aircraft typically feature an Environmental Control System (ECS) to supply conditioned air at a suitable temperature and pressure to the cabin of the aircraft, and optionally provide pressurised air to other subsystems such as anti-icing systems. The source of pressurised air of a conventional ECS for civil transport aircraft is represented by a high pressure air that is bled from the core compressors of the engine. For example, high pressure and temperature bleed air is extracted from one or more pressure regulating valves of the core compressor(s) during operation of the engine. While a portion of this bleed air might be used for anti-icing purposes, the remaining flow enters an air conditioning pack, where the air is cooled down to meet the cabin conditioning demand.

For military aircraft, it is known to include active flow control technologies that enhance the performance of their movable control elements, such as a rudder section on the vertical tail of an aircraft. In this regard it will be appreciated that by deflecting the rudder it is possible to produce the required yaw control to maintain the desired flight path, e.g. during crosswind conditions. However, the maximum force generated by a movable control element is usually limited by flow separation that occurs on the suction side of the element, i.e. where a boundary layer of fluid (gas) on the suction side surface travels against an adverse pressure gradient such that the speed relative to the surface falls to zero. To address this, it is known to provide active flow control systems that are operable to eject a source of fluid out of the aircraft across the desired surfaces of the movable control element to impart momentum into an air stream flow over the surfaces. As a result, flow separation on those surfaces is reduced and greater lift is achieved. Therefore, the provision of a flow control system enables the movable control elements to operate with higher deflection before flow separation is experienced, and generate a larger force. This capability can yield significant size reductions for the movable elements, which translates in a substantial decrease in aircraft drag and fuel burn.

The source of fluid for a conventional active flow control system is in the form of the aircraft auxiliary power unit or engine core bleed. However, this requires the integration of a number of additional components in the aircraft to manage and distribute the fluid flow. The weight and complexity of the resulting system often erodes the benefits deriving from the enhanced aircraft aerodynamic performance, such that active flow control systems are often considered to be unsuitable for civil transport aircraft.

It is therefore desired to provide an improved system for providing active flow control in an aircraft.

SUMMARY

According to a first aspect of the disclosure, there is provided a system for providing active flow control in an aircraft having a gas turbine engine, wherein the system comprises: an environmental control system that may include a cabin blower system, wherein the cabin blower system may comprise a compressor that is operable to compress a fluid delivered by a fan section of the gas turbine engine to generate pressurised fluid for use by the environmental control system; and an active flow control system for ejecting pressurised fluid out of the aircraft across an exterior surface of a movable control element of the aircraft; wherein the environmental control system is fluidicly connected to the active flow control system via a fluid supply line, for allowing at least some of the pressurised fluid generated by the compressor to be supplied to and used by the active flow control system.

The aircraft may be a civil transport aircraft.

The compressor may be driven by a shaft of a gas turbine engine via a variable transmission, wherein the variable transmission may give selectively variable control over the rate at which the compressor is driven.

The compressor may be a variable geometry compressor that gives selectively variable control over the pressure and rate at which fluid is outputted from the compressor.

The supply line may comprise an isolation valve which gives selective control over whether the pressurised fluid generated by the compressor is allowed to flow to the active flow control system.

The supply line may comprise a duct or conduit that is allocated to exclusively provide the flow control system with at least some of the pressurised fluid generated by the compressor.

The system may further comprise an auxiliary power unit operable to generate an auxiliary pressurised fluid when the cabin blower system is inactive. The auxiliary power unit may be fluidicly connected to the environmental control system via a supply conduit, for supplying the environmental control system with the auxiliary pressurised fluid when the cabin blower system is inactive. The supply conduit may form at least a part of the fluid supply line that fluidicly connects the environmental control system and the active flow control system.

The supply conduit may comprise an isolation valve which gives selective control over whether fluid is allowed to flow to and from the auxiliary power unit.

According to a second aspect of the disclosure, there is provided an aircraft comprising a system according to any preceding statement.

The moveable control element may be a deflectable rudder attached to a platform of a vertical tail of the aircraft.

The movable control element may be a deflectable flap that is attached to a main body of a wing of the aircraft.

The deflectable flap may be a plain flap that abuts or is immediately adjacent a trailing edge side of the main body of the wing.

The actuation mechanism for the deflectable flap may be (e.g. entirely) enclosed within the main body of the wing.

The active flow control system may include a plurality of sweeping jet actuators. The sweeping jet actuators may be disposed within the platform of the vertical tail or the main body of the wing.

According to a third aspect of the disclosure, there is provided a method of providing active flow control for a movable control element of an aircraft having a gas turbine engine. The method may comprise: providing the system or the aircraft of any one of the preceding statements. The method may further comprise: generating at the environmental control system, by the compressor operating in a first operating mode, a pressurised fluid for use by the environmental control system; supplying the active flow control system with the pressurised fluid via the fluid supply line; and ejecting the pressurised fluid out of the aircraft across an exterior surface of the movable control element of the aircraft.

The system may comprise an auxiliary power unit and the fluid supply line may be formed, at least in part, by a supply conduit fluidicly connecting the environmental control system and the auxiliary power unit. The method may further comprise: using the supply conduit to supply the environmental control system with a pressurised fluid generated at the auxiliary power unit, when the compressor is inactive or is operating in a second operating mode in which the compressor acts as a turbine to drive the gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
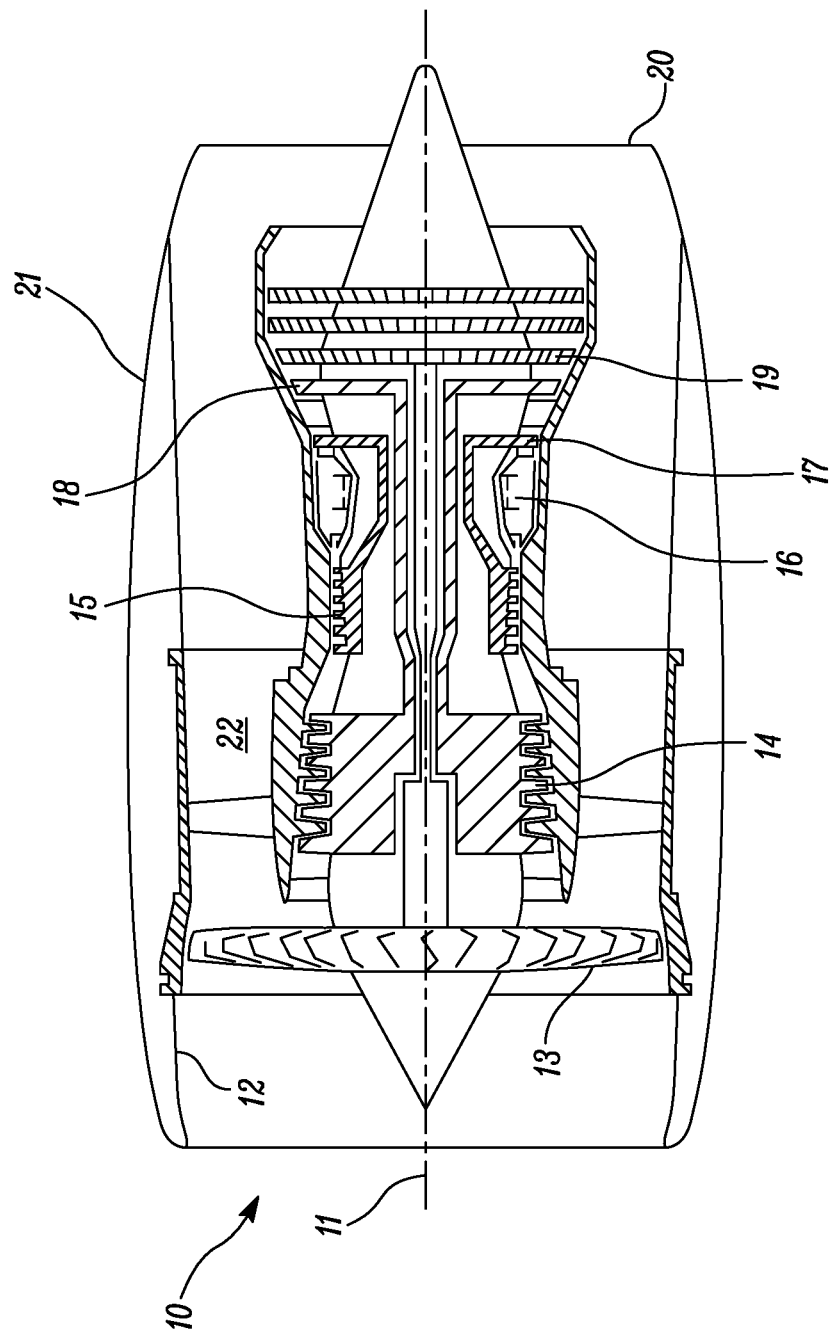
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
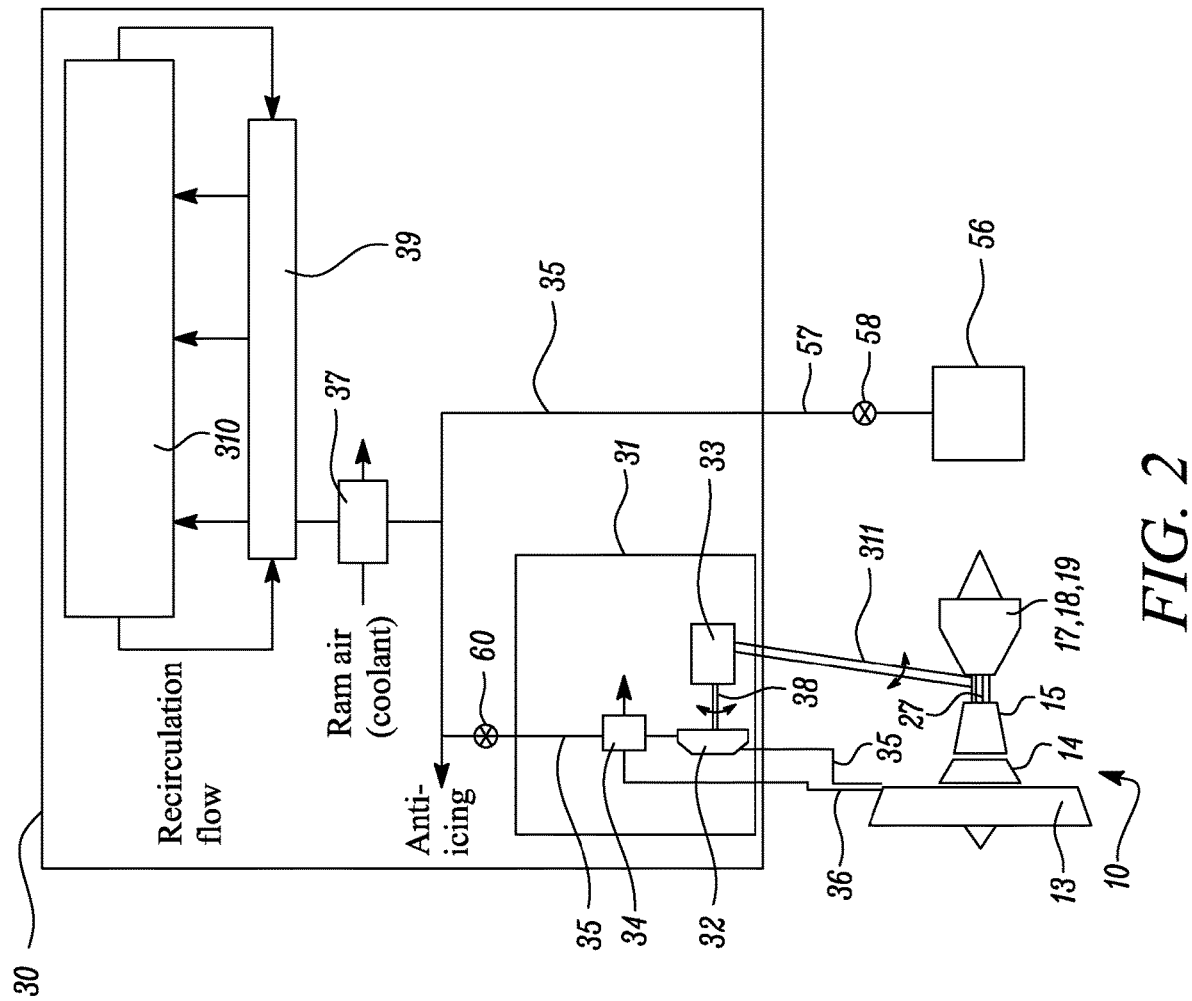
FIG. 2 is a schematic illustration of an environmental control system of the system for providing active flow control in an aircraft having a gas turbine engine as described with respect to FIG. 1.

FIG. 2 is a schematic illustration of an environmental control system forming part of a system for providing active flow control in an aircraft including a gas turbine engine substantially as described with respect to FIG. 1. As mentioned briefly above, an environmental control system (ECS) 30 is provided within an aircraft to supply conditioned air at a suitable temperature and pressure to a cabin 310 of the aircraft, and provide pressurised air to key subsystems such as wing and engine anti-icing (not shown).

An ECS 30 is typically supplied with a source of fluid (e.g. air) from the compressor stage(s) 14, 15 of the gas turbine engine 10. However, the ECS 30 of the present arrangement receives an alternative source of fluid (air in the present arrangement) which is provided by a Cabin Blower (CB) system 31. The CB system 31 employs a centrifugal compressor 32 which is driven in use by one of the interconnecting shafts of the engine 10 described above with respect to FIG. 1, to deliver pressurised fluid (pressurised air) flow to the aircraft according to the ECS demand. The CB system 31 in the present arrangement is a variable geometry centrifugal compressor 32.

The compressor 32 is connected to a shaft 27 of the gas turbine engine 10 in a driving relationship. In the drive path intermediate the shaft 27 and compressor 32 is a continuously variable transmission 33 which is provided to control the rate at which the compressor is rotated, independently of the engine shaft speed. The shaft 27 of the gas turbine engine and the continuously variable transmission 33 are drivingly coupled by an accessory shaft 311. The compressor 32 and the continuously variable transmission 33 are drivingly coupled by a compressor shaft 38. It will be appreciated that variations to the arrangement above are possible. For example, there may be one or more accessory gearboxes provided along the drive path.

The compressor 32 is disposed in a duct system 35 coupled at a first side of the compressor to a fluid (air) source within the engine 10 at the exit of the fan section 13 to the compressor 14. A second side of the compressor 32 opposite the first side is coupled to a pre-cooler 34 which is operable to use fan delivery air (received from a separate duct 36 fluidicly coupled to the fan section 13) to cool the pressurised air to regulate its temperature to within acceptable limits (typically below 200° C.). It will be appreciated that in some arrangements the CB system 31 will not have a pre-cooler 34.

The duct 35 (and thus pressurised air) exits the CB system 31 to be used by the wider ECS 30 (or optionally for engine or wing anti-icing purposes). In particular, an air conditioning pack 37, where air is cooled down to meet the cabin conditioning demand, is coupled to the duct 35 so as to receive at least some of the pressurised air generated by the compressor 32. The air conditioning pack 37 comprises a refrigeration cycle which uses ram air as coolant. The pack mass flow is controlled using an active flow control valve (not shown), whose opening is modulated to match the demand determined by a pack controller (not shown). The conditioned flow is then delivered to a mixing manifold 39, where it is mixed with a portion of the cabin air before being introduced to the cabin 310 itself.

Between the compressor 32 (or pre-cooler 34, if present) and the air conditioning pack 37 in the duct 35 is an isolation valve 60. The isolation valve 60 is arranged to be operable to alternatively allow one of two conditions, controlled via appropriate control signalling from a corresponding controller(s). In a first condition the valve 60 permits the flow of air to and from the compressor 32. In a second condition the valve 60 seals the duct 35 to prevent flow to and from the compressor 32.

The duct 35 is fluidicly coupled to a supply conduit 57 extending out from the ECS 30 to an Auxiliary Power Unit 56, which is incorporated towards the trailing side of the aircraft proximate the tail. The auxiliary power unit 56 is operable to generate electricity and high pressure air during ground level operations, for example, when the gas turbine engine 10 and accordingly the CB system 31 is inactive (in the sense that it does not itself generate a pressurised fluid). In those circumstances, the high pressure air generated by the auxiliary power unit 56 is supplied to at least the aircraft conditioning pack 37 through the supply conduit 57 to provide suitably conditioned air to the cabin.

The CB system 31, particularly the compressor 32, has both a first and second operating modes which in use allow the system 31 to perform as a cabin blower or as part of a starter system for the gas turbine engine respectively.

In the first operating mode the compressor 32 is driven by the gas turbine engine shaft 27 via the accessory shaft 311, the transmission 33 and the compressor shaft 38. The compressor 32, driven by the gas turbine engine shaft, compresses air collected by the fan section 13 and delivered to the compressor via the duct system 35. Thereafter the air is delivered by the duct system 35 for regulated use in the cabin 310 of the aircraft via the air conditioning packs 37. When the CB system 31 is operating in this mode, the auxiliary power unit is inactive. For example, the supply conduit 57 may include an isolation valve 58 (controlled via appropriate control signalling) for the auxiliary power unit 56, to prevent pressurised fluid generated by the compressor 32 from entering the auxiliary power unit 56.

In the second operating mode the compressor 32 acts as a turbine and drives the gas turbine engine shaft 27 via the compressor shaft 38, transmission 33 and accessory shaft 311. The compressor 32 is driven by a pressurised fluid (typically air) that is generated and supplied by the auxiliary power unit 56 while the isolation valve 58 of the auxiliary power unit 56 is open. The pressurised fluid drives the compressor 32 in the opposite direction to its rotation when the system 31 is operating in the first operating mode. Furthermore, the transmission 33 is adjusted so that despite the rotation of the compressor 32 in the opposite direction to that when the system 31 is operated in the first operating mode, the drive direction delivered to the shaft 27 of the gas turbine engine 10 is common to the direction of rotation of the same shaft 27 when the system 31 is operated in the first operating mode.

The compressor rotational speed and variable geometry, and thus the flow rate of the compressor, are controlled independently from the engine power settings, thereby allowing the system 31 to deliver the correct flow at the right pressure at any point of the flight cycle.

The skilled person would appreciate that although only one example of a cabin blower system is described above, a number of variants of the cabin blower system can be conceived. One such variant is described further in an existing patent publication, US 2016/0167789 A1, which is incorporated herein by reference.

It will also be appreciated that while only one gas turbine engine 10 is shown in FIG. 2, many aircraft employ two or more such engines. In those cases, the environmental control system 30 may comprise at least one further CB system 31 and associated duct system 35, e.g. one for each additional engine of the aircraft. Furthermore, the environmental control system 30 may include a respective conditioning pack 37 for each cabin blower system 31, where the respective conditioning packs 37 feed the conditioned fluid into a common manifold section 39 before being introduced into the cabin.

Figure 3:
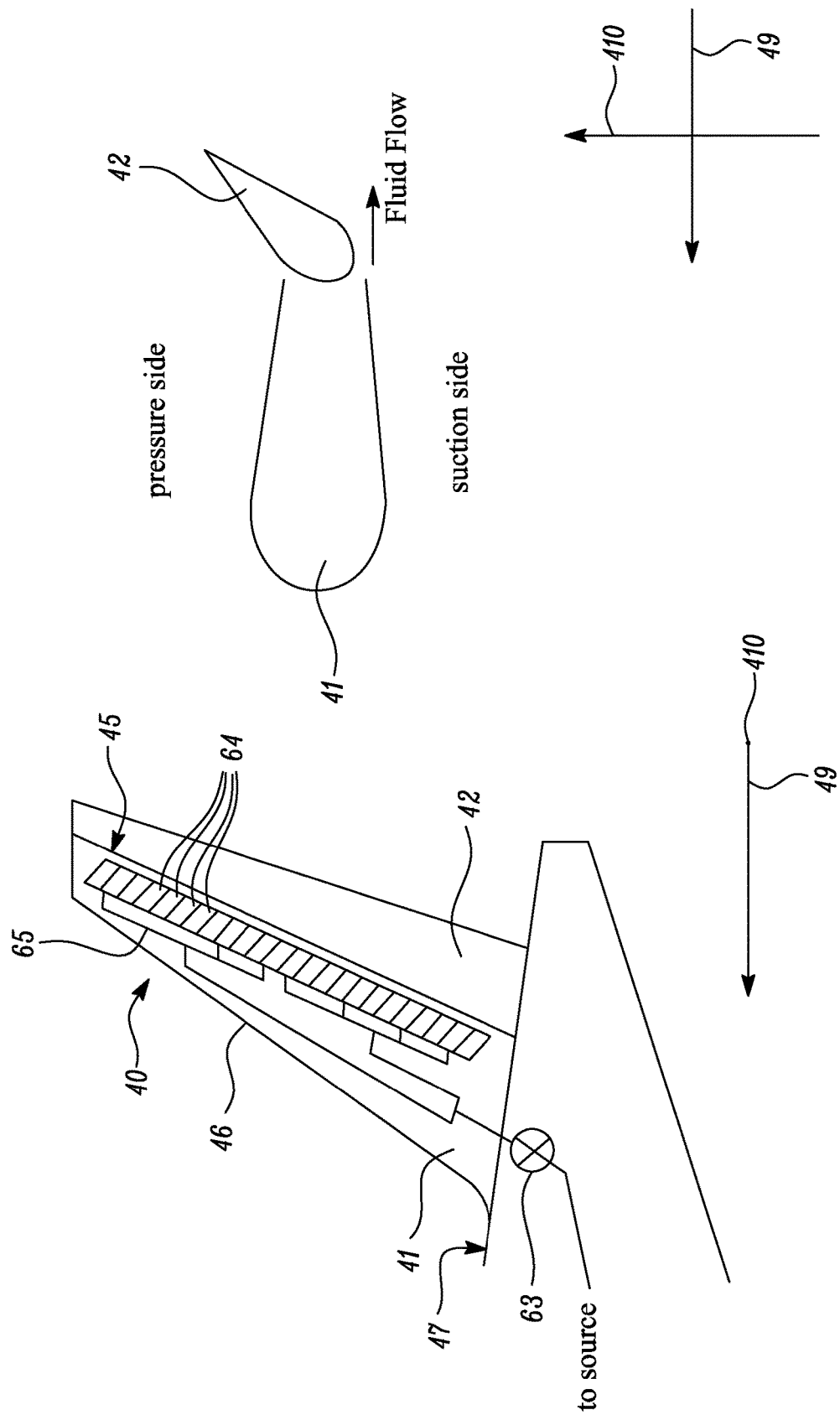
FIG. 3 is a schematic illustration of an active flow control system forming part of the system for providing active flow control in the aircraft as described with respect to FIG. 2.

FIG. 3 is a schematic illustration of an example of an active flow (separation) control system forming part of the system for providing active flow control in an aircraft including a gas turbine engine as described with respect to FIG. 1. In particular, FIG. 3 illustrates an active flow (separation) control system for a movable control element on a vertical tail of the aircraft. Two views of the vertical tail are shown in FIG. 3, a first, side-on view of the tail including a schematic representation of its internal components, and a second, cross sectional view of the aircraft tail taken along a plane that divides the tail in a longitudinal direction of the tail.

As shown, the tail comprises a vertical stabiliser or platform 41, which is fixed to and extends from the fuselage 47 of the aircraft in a longitudinal direction. The platform 41 has a leading edge 46 in the aircraft travel direction 49 and a trailing edge 45 (opposite the leading edge 46) along the span of which a movable control element 42, known as a rudder, is attached. The rudder 42 is pivotable at its attachment point to the platform 41 so as to allow the rudder 42 to be deflected (e.g. with suitable actuators) relative to the platform 41 and substantially in a transverse direction 410 perpendicular to the aircraft travel direction 49, i.e. towards the port and starboard sides of the aircraft. Deflection of the rudder 42 relative to the platform 41 causes the air flowing past the external surfaces of the tail to exert a force on those surfaces, and varying the extent and direction of deflection provides control of the required yaw to maintain the desired flight path during flight.

The active flow control system 40 may take any suitable form known in the art. However, in the present arrangement the flow control system 40 includes a plurality of sweeping jet actuators 64 disposed within the platform at vertically separate positions along the trailing edge 45 of the platform 41. The sweeping jet actuators 64 each comprises a chamber for receiving the pressurised fluid and an outlet nozzle (not shown) facing the rear of the aircraft (in a direction opposite the travel direction 49) and pointing towards the exterior surfaces of the rudder 42, so as to direct fluid flow leaving the chamber across those surfaces 42. The outlet nozzle may be a slit or slot in the form of an opening on the outer surface of the platform 41 extending in a span-wise direction parallel to the longitudinal direction along which the platform 41 extends from the fuselage 47.

As best shown by the cross-sectional view, the exterior surfaces of the tail substantially define an aerofoil shape in cross-section, and the active flow control system may be configured to eject a flow of pressurised fluid across the suction side surface on the exterior of the rudder. It will be appreciated that there may be a suitable outlet nozzle on each of the port and starboard sides of the platform 41, which are used in a mutually exclusive manner so as to allow the fluid to be directed to the suction side regardless of the direction along which the rudder 42 is deflected.

The active flow control system 40 also comprises a conduit system 65 that couples the (chambers of the plurality of the) sweeping jet actuators 64 to a source of pressurised fluid (not shown). An isolation valve 63 (controlled via appropriate control signalling) is provisioned within the conduit system 65 to control the flow supply to the active flow control system 40 from the source, i.e. to selectively either allow or prevent the supply of pressurised fluid to the active flow control system 40 from the ECS 30.

As mentioned above, the source of fluid for a conventional active flow control system is typically in the form of the aircraft auxiliary power unit, which as described above with respect to FIG. 2 may also supply pressurised fluid to the ECS 30. However, such an arrangement requires the integration of a number of additional components in the aircraft to manage and distribute the fluid flow. For example, it is often required to provide an externally mounted pre-cooler to cool down the fluid generated by the auxiliary power unit, which may add significant weight to the overall aircraft. Furthermore, the auxiliary power unit can face difficulty generating a suitable fluid flow that meets the fluid speed and pressure requirements of the active flow control system, such that the energy required to drive the auxiliary power unit to meet that demand, often outweighs the aerodynamic benefit.

The arrangement of the present disclosure, however, provides an alternative fluid source for the aircraft active flow control system. In particular, in contrast to conventional arrangements, in the present arrangement the cabin blower system is used as the source of pressurised fluid for the active flow control system 40, as will now be described with respect to FIG. 4.

Figure 4:
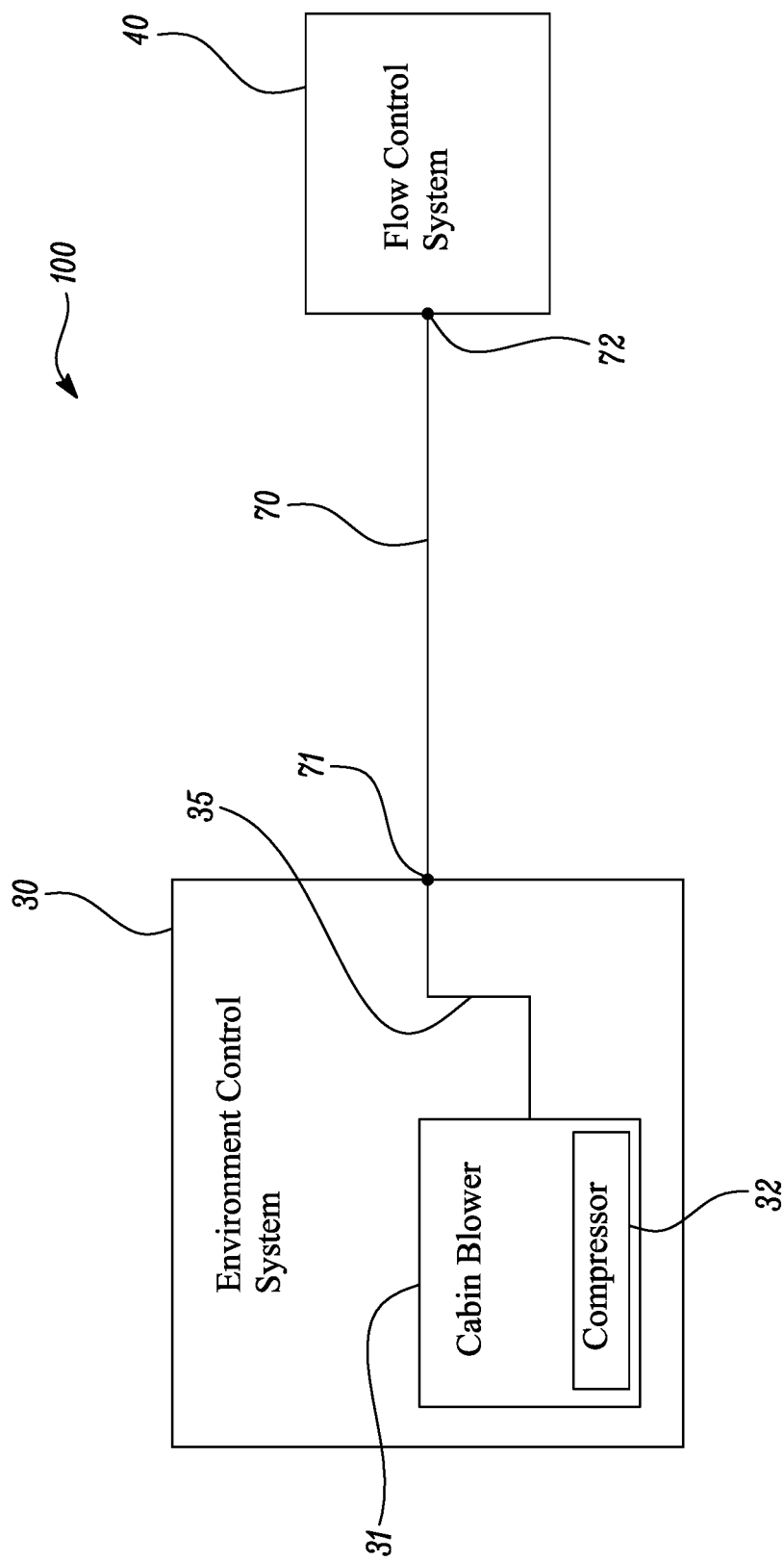
FIG. 4 is a schematic illustration of a system comprising the environmental control system and active flow control system of FIGS. 2 and 3, respectively.

FIG. 4 is a schematic illustration of a system for providing active flow control in an aircraft including a gas turbine engine. As shown, the system 100 comprises an environmental control system 30 which is fluidically connected to an active flow control system 40, for allowing at least some of the pressurised fluid generated by the compressor 32 to exit the environmental control system 30 and be supplied to and used by the active flow control system 40.

The environmental control system 30 can be fluidicly connected to the active flow control system 40 in any suitable or desired manner. In the present arrangement, there is a supply line 70 (e.g. a duct or conduit) extending along a length of the aircraft for this purpose. The supply line 70 has a first end 71 fluidically coupled to the duct system 35 of the environmental control system 30, within which the compressor 32 is disposed, or directly to an outlet of the compressor 32. A second end 72 of the supply line 70 opposite the first end 71 is fluidically coupled to the conduit system 65 of the active flow control system 40, e.g. an inlet port thereof which is upstream of the isolation valve 63. The supply line 70 may be a dedicated conduit or duct, in that it is allocated to exclusively deliver the pressurised air generated by the compressor 32 to the active flow control system 49. This may provide greater control and flexibility as to where within the aircraft and when the flow control system may be used.

The compressor of the CB system 31 is a particularly advantageous source of pressurised fluid for use by the active flow control system 40 in that it may be employed to supply pressurised flow to the aircraft active flow control system at a relatively low thermodynamic cost and in a way that minimises weight by using existing on-board systems and components.

In this regard, the variable transmission and variable geometry of the compressor 32 of the CB system 31 allow the compressor to be dynamically set to generate pressurised fluid at a flow capacity that is within a range of possible flow capacities. This enables the compressor output to be varied as needed during operation. The maximum flow capacity that the compressor 32 is capable of producing is preconfigured based on hazard/failure operation requirements of the ECS, e.g. the flow capacity that may be required to supply the cabin and/or anti-icing systems during critical flight conditions such as when the engine is at idle with a single source of air available or when the aircraft is operating in icing environments. As a consequence of this, the compressor 32 is pre-designed to have a maximum flow capacity that is greatly oversized for the majority of normal flight operating conditions. For example, in the take-off envelope the flow capacity of the compressor 32 that is required to adequately supply the ECS 30 (and thus how hard the compressor is working) is only a small fraction of its maximum capacity.

By fluidicly coupling the ECS 30, particularly the output of the compressor 32, and the active flow control system 40, the excess flow capacity of the compressor 32 can be used to supply pressurised flow to the aircraft active flow control system 40. For example, during at least some flight conditions, the variable transmission and/or geometry of the compressor 32 can be varied to set the current operating capacity of the compressor 32 at a level that is above the capacity required to meet the ECS 30 demand. The excess fluid flow generated by the compressor 32 can then be supplied to the active flow control system 40 to enhance the aircraft aerodynamic performance through active flow control.

In this way, the present arrangement provides the benefits of active flow control systems but without the added weight, energy expenditure and complexity that would otherwise be required in hypothetical arrangements where an active flow control system is supplied by the auxiliary power unit or other dedicated source of fluid. Indeed, preliminary calculations have shown that the flow and pressure demand of aircraft active flow control systems could be met without re-sizing the blower.

Figure 5:
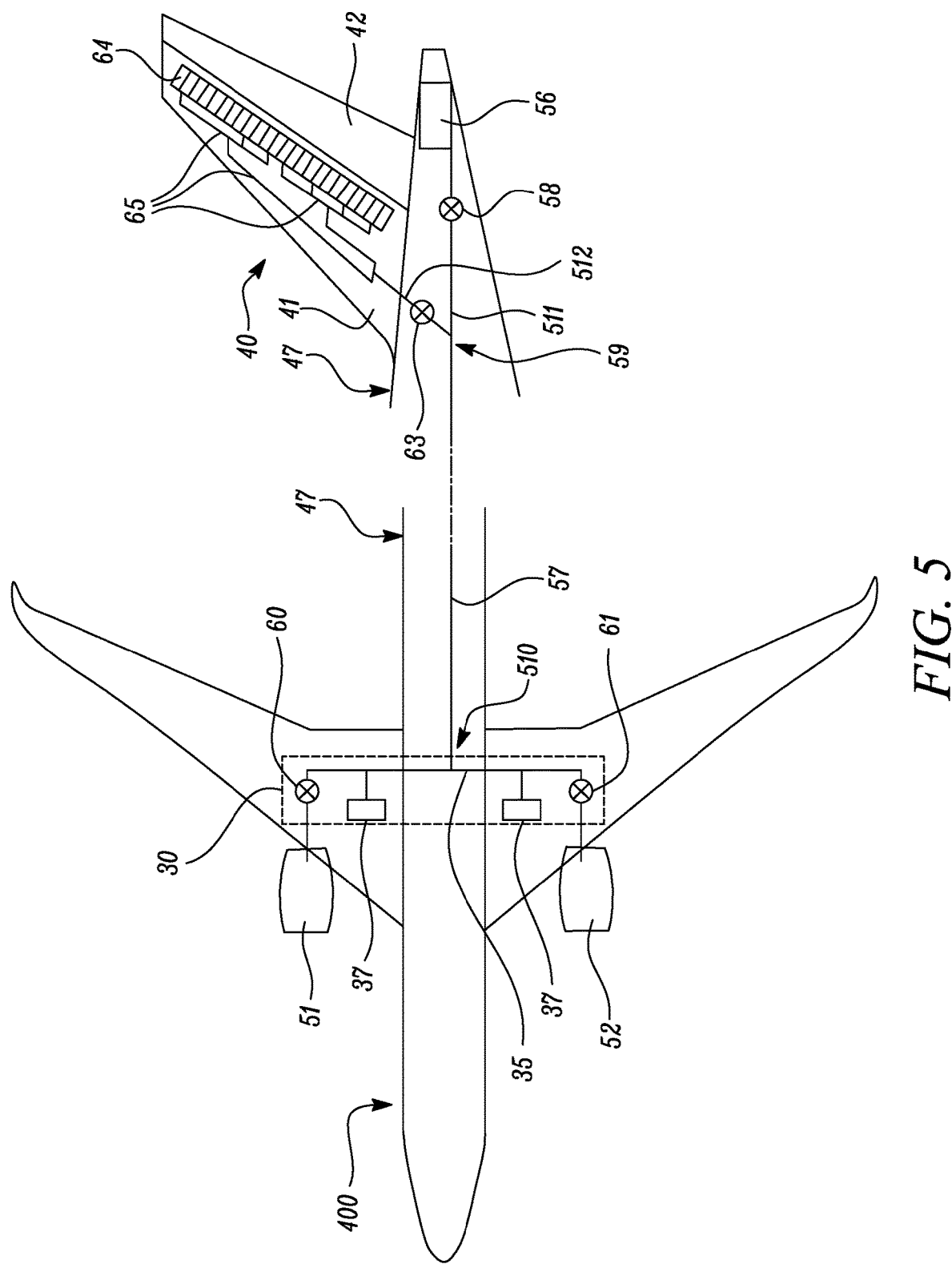
FIG. 5 is a schematic illustration of an example aircraft including the system of FIG. 4.

FIG. 5 is a schematic illustration of an example of an aircraft 400 that includes the system 100 of FIG. 4.

The aircraft 400 is a civil transport aircraft that is provided with two gas turbine engines, a first gas turbine engine 51 and a second gas turbine engine 52, each of which is substantially as described with respect to FIG. 1.

The aircraft 400 includes an environmental control system 30 and an active flow control system that is substantially as described above with respect to FIGS. 2 and 3, respectively (and thus like references are used to depict like features), except for a few features that will now be described.

With regard to the environmental control system 30, the present arrangement differs from that described above with respect to FIG. 2 in that it comprises two cabin blower systems (not shown), each of which is coupled to and driven by a corresponding one of the gas turbine engines 51, 52, and the associated duct system 35 is extended to receive pressurised fluid generated by both of the cabin blower systems. The environmental control system 30 also includes a respective conditioning pack 37 for each cabin blower system, where the respective conditioning packs 37 feed the conditioned fluid into a common manifold section (not shown) before being introduced into the cabin of the aircraft. Both cabin blower systems are coupled to a common auxiliary power unit 56 via the duct system 35 and supply conduit 57 extending from the ECS 30 to the auxiliary power unit 56. In this way, the auxiliary power unit 56 may supply the cabin blower systems when they are operating in the second operating mode, as part of a starter system for the gas turbine engines.

With regard to the active flow control system 40, the supply conduit 57 of the auxiliary power unit 56 forms at least a part of the fluid supply line 70 that fluidicly connects the ECS 30 and active flow control system 40. In particular, a second end 59 of the supply conduit 57, which is opposite a first end 510 that is fluidicly connected to the ECS 30, branches off into two separate branches, a first branch 511 that is fluidicly connected to the auxiliary power unit 56 and a second branch 512 that is fluidicly connected to an inlet port of the active flow control system 40. The isolation valve 58 of the auxiliary power unit 56 is positioned within the first branch 511 and the isolation valve 63 of the active flow control system 40 is positioned within the second branch 512, accordingly.

In this way, the supply conduit 57 forms at least a part of the fluid supply line, for allowing the pressurised fluid generated by the compressors of the cabin blower systems to be supplied to the active flow control system when the auxiliary power unit is inactive.

The existing supply conduit 57 of the auxiliary power unit 56 is particularly suitable for use as the fluid supply line (for the active flow control system 40) because, during normal operation when the cabin blower systems are actively generating pressurised air to meet the ECS demand, the auxiliary power unit is inactive such that the supply line 57 would be unused. The present arrangement therefore uses the supply line 57 in what is essentially a reverse mode, where at least some of the fluid generated by the cabin blower systems flows through the supply line 57 in the opposite direction, from the ECS 30 towards the auxiliary power unit 56, before branching off to the active flow control system 40. This arrangement may be particularly advantageous in that it maximises the use of existing supply lines within the aircraft and obviates the need for extra piping for the active flow control system 40, which would add weight to the aircraft.

In the present arrangement, the active flow control system may be designed for a total jet mass flow such that the actuation mass flow coefficient (total jet mass flow/ freestream velocity×vertical tail planform area×freestream density) is greater than 0.04%. Additionally, the active flow control system may be designed to generate a jet velocity such that the actuation momentum coefficient (total jet mass flow×jet velocity/freestream dynamic pressure×vertical tail planform area) is comprised within 0.3% to 0.8% for effective flow control.

The active flow control system of the present arrangement may be selectively and alternatively turned either on or off as may be required during a flight cycle, as will now be described.

In flight during low altitude operations (e.g. below 2500 feet), or during take-off or landing, for example, the cabin blower systems of engines 51 and 52 are activated (and their respective isolation valves 60, 61 are opened) and therefore supply the pressurised fluid to the packs 35 of the ECS 30. In these circumstances, the ECS flow demand is typically a fraction of the ultimate flow capacity of the blowers, owing to the high air inlet density at the fan. The active flow control system 40 can therefore be turned on so as to use the excess capacity of the compressors of the aircraft cabin blower systems to supply pressurised flow to the aircraft active flow control system 40. This may be done by opening the isolation valve 63 of the active flow control system and varying the variable transmission and/or geometry of the compressors to set the current operating capacity of the compressor 32 to a higher level that is above the capacity required to meet the ECS 30 demand. In this way, the conduit system 65 and corresponding chambers 64 of the active flow control system 40 are pressurised by the cabin blower delivery flow such that the active flow control system 64 can be said to be in an "armed state", at which point the pressurised fluid can be directed out of the chambers through the outlet nozzles across the control surfaces of the rudder 42. The pressurised flow from the compressors 32 will be isolated from the auxiliary power unit 56 owing to the corresponding isolation valve 58 of the auxiliary power unit 56 being closed. In this arrangement, the supply conduit 57 associated with the auxiliary power unit 56 will be used in reverse mode to supply the pressurised fluid flow to the active flow control system 40.

The active flow control system 40 can be turned off by closing the isolation valve 63 of the active flow control system 40, to prevent the pressurised fluid flow from entering the system 40. This may be desirable both during a flight cycle and during ground level operations. During a flight cycle, if the gas turbine engines 51, 52 were to experience hazard/failure operating conditions, the full capacity of the cabin blower systems (i.e. their compressors) could be used to meet the ECS demand on occasions. During ground level operations, the active flow control system 40 may be rendered inactive so as to allow the auxiliary power unit 56 to be used to supply pressurised air to the conditioning packs 35 through the supply conduit 57. In this arrangement, the auxiliary power unit isolation valve 58 would be open, whilst the cabin blower isolation valves 60 and 61 would be closed. In further arrangements, the auxiliary power unit 56 may also be used for engine starting, and in that case the isolation valves 60 and 61 of the cabin blower systems would be open. In particular, pressurised fluid coming from the auxiliary power unit 56 along supply conduit 57 might be used to drive the compressors of the cabin blower systems in a second operating mode to achieve engine starting.

It will be appreciated herein that various modifications can be made to the example arrangement of FIG. 5 without departing from the concepts described herein. For example, the supply conduit 57 may include an additional isolation valve positioned upstream of the isolation valves 58 and 63 of the auxiliary power unit 56 and active flow control system 40 at an end of the supply conduit 57 that is closer to the ECS 30 than the branching point between the auxiliary power unit 56 and active flow control system 40.

Additionally, a cross-feed valve may be positioned within the duct system 35 of the ECS 30 between the two cabin blower systems and their respective conditioning packs 37, to selectively either prevent or allow pressurised fluid to flow between the conditioning packs 37. For example, in some arrangements where active flow control and auxiliary fluid flow from the auxiliary power unit 56 is not desired, the active flow control and auxiliary power unit isolation valves 63, 58, and the cross-feed valve are closed such that pressurised flow from the respective cabin blower systems will supply their respective packs 37 only. However, in the event of a cabin blower or engine failure (51 for example), the isolation valve 60 of the corresponding cabin blower system would be closed, and the cross-feed valve 62 would be opened to allow a single blower to feed both conditioning packs.

Although the active flow control system 40 has been described above as being for a vertical tail of the aircraft, the system would be suitable for use with any movable control element(s) of the aircraft.

Figure 6:
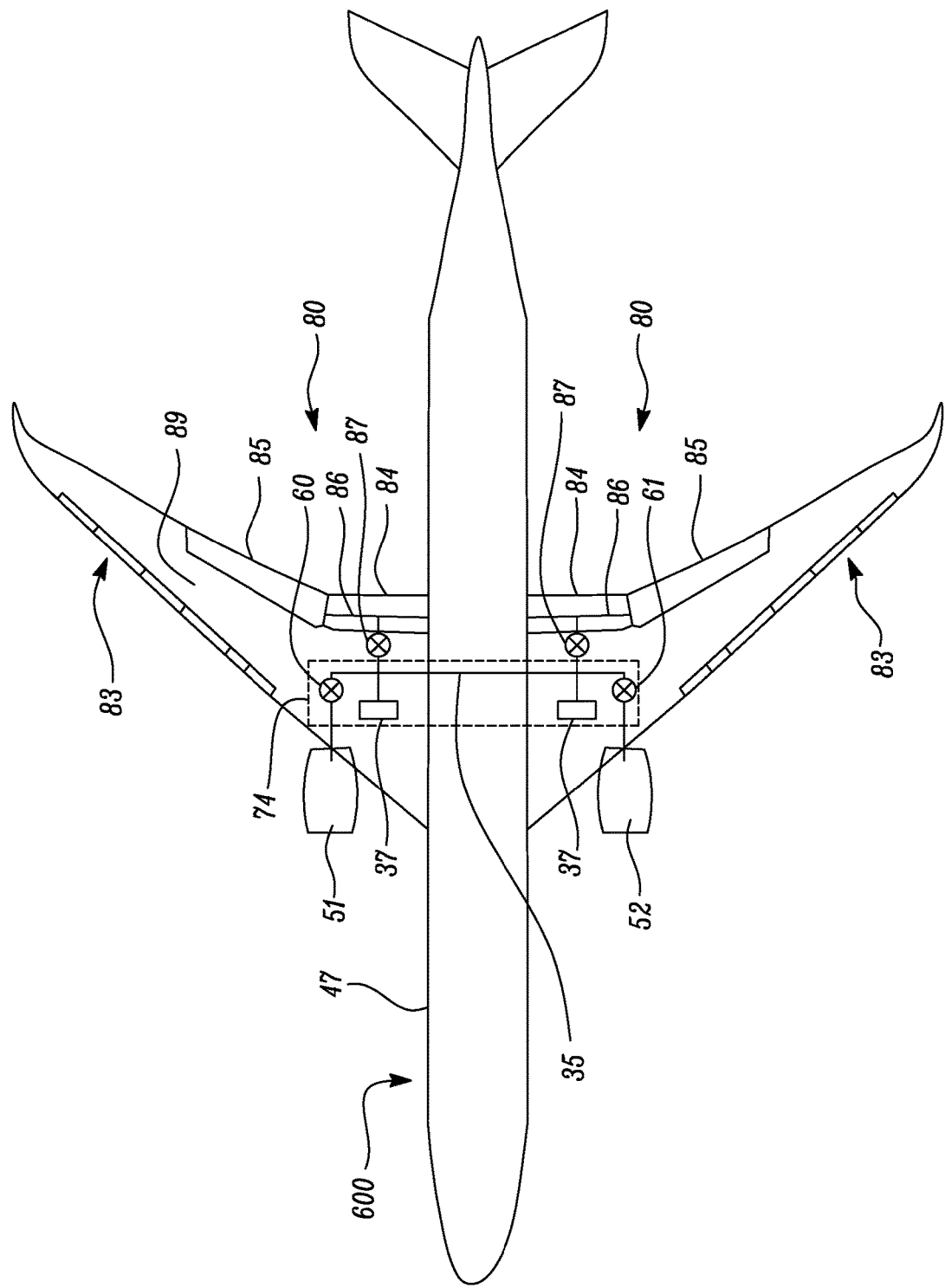
FIG. 6 is a schematic illustration of another example aircraft including the system of FIG. 4.

FIG. 6 schematically illustrates one such example where the active flow control system is incorporated in each wing of an aircraft. In the present arrangement, this is provided instead of the active flow control system provided for a tail of the aircraft as described above, although in other arrangements the aircraft may incorporate both types of active flow control systems.

The aircraft 600 of FIG. 6 is a civil transport aircraft that is provided with two gas turbine engines, a first gas turbine engine 51 and a second gas turbine engine 52, each of which is substantially as described with respect to FIG. 1. The aircraft also comprises an environmental control system 74 and an active flow control system 80.

Each wing 83 of the aircraft 600 is equipped with moveable control surfaces, in particular leading edge high-lift devices (in the form of slats), and trailing edge high-lift devices. The trailing edge high-lift devices include an inboard flap 84 and an outboard flap 85. The inboard flap 84 is a "plain flap", as referred to in the art, which is a flap that substantially abuts or is immediately adjacent a trailing edge side of the main body 89 of the wing 83 and is hinge mounted to the trailing edge side. This is in contrast to a "slotted flap", as is referred to in the art, which is a flap that is connected to the main body of the wing in a position that defines a gap (or slot) between the flap and the (e.g. trailing edge side of the) main body, such that high pressure air from below the wing is directed over the top of the flap thereby helping the airflow remain attached to the flap, increasing lift compared to a typical plain flap. Each inboard flap 84 of the present arrangement is provided with a respective active flow control system 80. The active flow control system may be substantially as described above with respect to FIGS. 3 and 5, in that the active flow control system 80 may include a plurality of sweeping jet actuators disposed within the main body 89 of the wing 83, but at separate positions along the trailing edge side of the main body 89 along a longitudinal direction along which the wing extends, so as to direct fluid flow across the top exterior surfaces of the inboard flap 84. In the present arrangement, the active flow control system 80 comprises an ejection slot 86 on the top surface of the inboard flap 84, for ejecting a pressurised fluid flow received from the environmental control system 74 across the top surface of the inboard flap 84. The active flow control system 80 may take the form of a traverse jet actuator substantially as described in U.S. Pat. No. 9,511,849 B2, which is incorporated herein by reference.

The active flow control system may be designed for a total jet mass flow such that the actuation mass flow coefficient is about 0.01%. Additionally, the active flow control system may be designed to generate a jet velocity such that the actuation momentum coefficient is around 0.1% for effective flow control.

The environmental control system 74 is substantially the same as that described above with respect to FIG. 5 in that it comprises two cabin blower systems driven by respective gas turbine engines 51, 52, two conditioning packs 37 and an associated duct system 35 and isolation valves 60, 61. However, the environmental control system 74 differs in that the duct system 35 is coupled to the two flow separation devices 80, one for each wing. Although not shown, the ECS 74 is also fluidicly connected to an auxiliary power unit (not shown) in the manner described above. The pressurised fluid supply to each active flow control system 80 is isolated through an associated isolation valve 87.

In flight during low altitude operations, or during take-off or landing, the aircraft ECS 74 would be fed from the cabin blower systems of engines 51 and 52 substantially as described above with respect to FIGS. 2 and 5. In these circumstances, the active flow control system 60 can be turned on so as to use the excess capacity of the compressors of the aircraft cabin blower systems to supply pressurised flow to the active flow control systems 80. This may be done by opening the isolation valves 87 of the active flow control systems and varying the variable transmission and/or geometry of the compressors to set the current operating capacity of the compressors to a higher level that is above the capacity required to meet the ECS 60 system demand. In this way, the supply active flow control system would be "armed" with high pressure fluid flow to be directed out of the ejection slot 86 across the top surfaces of the inboard flap 84.

The implementation of a flow separation control device on the wing of the aircraft in a manner as described above allows one to achieve the same lift generated by a conventional slotted flap but using a plain flap design, which does not require externally mounted actuation mechanisms such as flap track fairings (which would be required if using a slotted flap design). For example, the actuation mechanism for the inboard flap 84 is provided within the interior of (and is enclosed by) the main body 89 of the wing 83. This enables the removal of the exterior mounted flap track fairings of a conventional wing, with a significant saving in aircraft drag and fuel consumption. Furthermore, the simplification of the actuation mechanism for the flaps might generate a weight and cost saving over a conventional design.

Although the present arrangement of FIG. 6 has been described with respect to providing only the inboard flaps 84 with an active flow control system, it will be appreciated that active flow control can be provided to one or more or all of the moveable control surface surfaces of the wing.

It will be understood that the invention is not limited to the embodiments above-described and various modifications and improvements can be made without departing from the concepts described herein. For example, different flow separation control systems for various aircraft control surfaces (for instance ailerons, slats) could be considered. Alternative piping routing and/or valve arrangements can be envisaged depending on the specific application considered or control logic employed. Except where mutually exclusive, any of the features may be employed separately or in combination with any other features and the disclosure extends to and includes all combinations and sub-combinations of one or more features described herein.

We claim:

1. A system for providing active flow control in an aircraft having a gas turbine engine, the system comprising:
   an environmental control system that includes a cabin blower system, the cabin blower system comprises a compressor that is configured to compress a fluid delivered by a fan section of the gas turbine engine to generate pressurised fluid for use by the environmental control system;

an active flow control system configured to eject pressurised fluid out of the aircraft across an exterior surface of a movable control element of the aircraft; and an auxiliary power unit configured to generate an auxiliary pressurised fluid when the cabin blower system is inactive, the auxiliary power unit being fluidicly connected to the environmental control system via a supply conduit for supplying the environmental control system with the auxiliary pressurised fluid when the cabin blower system is inactive, wherein the environmental control system is fluidicly connected to the active flow control system via a fluid supply line to allow at least some of the pressurised fluid generated by the compressor to be supplied to and used by the active flow control system, and the supply conduit forms at least a part of the fluid supply line that fluidicly connects the environmental control system and the active flow control system.

2. The system of claim 1, wherein the compressor is to be driven by a shaft of a gas turbine engine via a variable transmission, and the variable transmission gives selectively variable control over a rate at which the compressor is driven.

3. The system of claim 1, wherein the compressor is a variable geometry compressor that gives selectively variable control over a pressure and rate at which fluid is outputted from the compressor.

4. The system of claim 1, wherein the fluid supply line comprises an isolation valve which gives selective control over whether the pressurised fluid generated by the compressor flows to the active flow control system.

5. The system of claim 1, wherein the fluid supply line comprises a duct or conduit that is allocated to exclusively provide the flow control system with at least some of the pressurised fluid generated by the compressor.

6. The system of claim 1, wherein the supply conduit comprises an isolation valve which gives selective control over whether fluid flows to and from the auxiliary power unit.

7. An aircraft comprising the system of claim 1.

8. The aircraft of claim 7, wherein the moveable control element is a deflectable rudder attached to a platform of a vertical tail of the aircraft.

9. The aircraft of claim 7, wherein the movable control element is a deflectable flap that is attached to a main body of a wing of the aircraft.

10. The aircraft of claim 9, wherein the deflectable flap is a plain flap that abuts or is immediately adjacent a trailing edge side of the main body of the wing.

11. The aircraft of claim 9, wherein an actuation mechanism for the deflectable flap is enclosed within the main body of the wing.

12. The aircraft of claim 7, wherein the active flow control system includes a plurality of sweeping jet actuators.

13. A method of providing active flow control for a movable control element of an aircraft having a gas turbine engine, the method comprising:

providing the system of claim 1;

generating at the environmental control system, by the compressor operating in a first operating mode, a pressurised fluid for use by the environmental control system;

supplying the active flow control system with the pressurised fluid via the fluid supply line; and ejecting the pressurised fluid out of the aircraft across an exterior surface of the movable control element of the aircraft.

14. The method of claim 13, further comprising utilizing the supply conduit to supply the environmental control system with a pressurised fluid generated at the auxiliary power unit when the compressor is inactive or is operating in a second operating mode in which the compressor acts as a turbine to drive the gas turbine engine.

* * * * *